US012483634B2

(12) United States Patent
Samuel

(10) Patent No.: US 12,483,634 B2
(45) **Date of Patent: *Nov. 25, 2025**

(54) CLOUD-BASED, GEOSPATIALLY-ENABLED DATA RECORDING, NOTIFICATION, AND RENDERING SYSTEM AND METHOD

(71) Applicant: James Allen Samuel, Fairfax, VA (US)

(72) Inventor: James Allen Samuel, Fairfax, VA (US)

(73) Assignee: Pluribus, Inc., McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/174,946

(22) Filed: Feb. 27, 2023

(65) Prior Publication Data

US 2023/0216931 A1 Jul. 6, 2023

Related U.S. Application Data

(63) Continuation of application No. 17/443,670, filed on Jul. 27, 2021, now Pat. No. 11,595,486, which is a continuation-in-part of application No. 16/949,875, filed on Nov. 18, 2020, now abandoned.

(60) Provisional application No. 63/056,871, filed on Jul. 27, 2020, provisional application No. 62/901,997, filed on Sep. 18, 2019.

(51) Int. Cl.

| | |
|---|---|
| ***G08B 21/02*** | (2006.01) |
| ***G01C 21/34*** | (2006.01) |
| ***G01C 21/36*** | (2006.01) |
| ***G08B 5/22*** | (2006.01) |
| ***G08B 25/10*** | (2006.01) |
| ***H04L 67/52*** | (2022.01) |
| ***H04L 67/55*** | (2022.01) |

(52) U.S. Cl.

CPC .......... *H04L 67/52* (2022.05); *G01C 21/3484* (2013.01); *G01C 21/3694* (2013.01); *G08B 5/22* (2013.01); *G08B 21/0272* (2013.01); *G08B 25/10* (2013.01); *H04L 67/55* (2022.05)

(58) Field of Classification Search

CPC ............ G01C 21/3694; G01C 21/3484; G01C 21/3461; G08B 5/22; G08B 21/0272; G08B 25/10; H04L 67/52; H04L 67/55; H04L 67/26; H04L 67/18

See application file for complete search history.

(56) References Cited

U.S. PATENT DOCUMENTS

| | | | | |
|---|---|---|---|---|
| 2012/0286959 | A1* | 11/2012 | Ray | G08B 21/12 340/627 |
| 2015/0350858 | A1* | 12/2015 | Reitnour | H04M 1/724 455/404.2 |
| 2016/0196737 | A1* | 7/2016 | Martin | G08B 25/10 340/539.13 |
| 2017/0127215 | A1* | 5/2017 | Khan | G08G 1/202 |
| 2017/0223302 | A1* | 8/2017 | Conlan | G08B 13/19695 |
| 2017/0238129 | A1* | 8/2017 | Maier | H04W 4/14 455/404.2 |
| 2018/0075720 | A1* | 3/2018 | Davies | H04N 5/76 |
| 2018/0330600 | A1* | 11/2018 | Polyakov | G08B 25/14 |
| 2018/0352303 | A1* | 12/2018 | Siddique | H04L 65/1069 |
| 2019/0329790 | A1* | 10/2019 | Nandakumar | B60W 50/0098 |

* cited by examiner

*Primary Examiner* — Muhammad Raza

(74) *Attorney, Agent, or Firm* — Dunlap Bennett & Ludwig, PLLC

(57) ABSTRACT

A cloud-based, geospatially-enabled data recording, notification, and rendering system.

7 Claims, 5 Drawing Sheets

CLOUD-BASED, GEOSPATIALLY-ENABLED DATA RECORDING, NOTIFICATION, AND RENDERING SYSTEM AND METHOD

CROSS-REFERENCE TO RELATED APPLICATION

This application claims the benefit of priority of U.S. provisional application No. 63/056,871, filed 27 Jul. 2020, the contents of which are herein incorporated by reference. This application claims the benefit of priority of U.S. provisional application No. 62/901,997 filed 18 Sep. 2019, the contents of which are herein incorporated by reference. This application claims the benefit of priority of U.S. non-provisional application Ser. No. 16/949,875, filed 18 Nov. 2020, as a continuation in part, the contents of which are herein incorporated by reference. This application claims the benefit of priority of U.S. non-provisional application Ser. No. 17/443,670, filed 27 Jul. 2021, as a continuation, the contents of which are herein incorporated by reference.

BACKGROUND OF THE INVENTION

The present invention relates to the field of emergency applications, and, more particularly, a cloud-based, geospatially-enabled data recording, notification, and rendering system.

Presently, people (and machines) that are in duress and/or experiencing a health and/or a security-related crisis ("emergency situations") do not have a manual or automated, personalized, cloud-based, geospatially-enabled, video, audio and/or data recording and rendering system to automatically inform supportive entities or machines.

Current devices or systems in the field of this invention only provide disparate, uncoordinated pieces of situational awareness, and none provide integrated geospatial data and rendering (map, etc.) of the recorded/streamed data. Other devices also require the user(s) to manually program and/or reconfigure their own devices in an attempt to perform the function of the present invention, and none suitably do so; thereby, further confounding the users, especially those who are not technically savvy. Finally, no other systems provide the automated notification of recorded events to supportive entities/machines along with renderings based on recorded data, wherein the automated notification may include an alert and inform law enforcement (and other security-related, supportive entities) of the nature, location, and ongoing proceedings (via the recorded data, including live stream and other data) of the identified emergency situations.

Presently, there are systems for recording and rendering (streaming) video via social media platforms, but none are geospatially-enabled and provide the location of these stressful events (especially in relation to the viewer). Moreover, these social media streaming services do not automatically notify supportive individuals or machines when a particular individual (such as their loved one/companions) are in duress and/or experiencing a health and/or security-related crisis. Smartphones record video/audio/data, but most require extensive memory storage on the device to accommodate these types of large file sizes. If said smartphone is lost or destroyed, this recorded data is lost or destroyed, too, in most cases. Social media sites do not allow users to discriminately notify loved ones of the creation, presence, and availability of these files for retrieval or downloading. Social media sites also do not allow loved ones/companions to retrieve and/or download these files. The present invention solves all of these problems.

Social-media and/or device-based systems do not work well because they are not integrated and streamlined for ease of use, they do not provide automated notification of stressful events, and they are not geospatially-enabled to tell *where* these events are happening in real-time (or after the fact).

As can be seen, there is a need for a cloud-based, geospatially-enabled data recording, notification, and rendering system.

The present invention combines, streamlines, and integrates multiple disparate technologies into an easy-to-use, single system for data recording/streaming, storage, provisioning, and geospatial rendering. No other current system or technology combines and performs these functions, which when combined into one system, provides compounded effectivity, efficiency and geospatial awareness for the user(s), both human and machine.

The present invention integrates these various elements, provided in whole or part by either the user's recording device and/or social media platforms and/or other sources of data input. The present invention also provides a geolocation (map coordinates and rendering display) of said events. Finally, this invention automates the notification process of these events to the supportive people/machines and allows them to retrieve, analyze, download and/or share said recording and associated data.

As stated above, presently, people (and machines) that experience stressful personal and environmental events do not have a manual or automated, personalized, cloud-based, geospatially-enabled, video, audio and/or data recording and rendering system to automatically inform supportive entities or machines when they are in duress and/or experiencing a health and/or in a security-related crisis. The present invention claimed herein solves this problem.

SUMMARY OF THE INVENTION

In one aspect of the present invention a method for presenting a map display of an emergency zone during an emergency situation, the method includes the following: in response to an emergency situation being identified, receiving at one or more processors in a first networked communication device, map data for an emergency zone defined by a second networked communication device; presenting by the one or more processors, a display map of the emergency zone, based on the map data; receiving at the one or more processors an indication of the second networked communication device relative to the first networked communication device; and presenting by the one or more processors, the indication of the second networked communication device on a portion of the display map corresponding to the emergency zone, the indication identifying locations of the first and second networked communication devices, whereby the received map data is associated with a notification to the first networked communication device.

It should be understood that the notification to the first networked communication device may be triggered through a toggle button that the emergency response application provides/represents on the user interface of the operatively associated second networked communication device. The notification may come in an additional form of a text message, email, or another electronic communication.

In another aspect of the present invention, the method further includes wherein the first networked communication device is associated with a supportive entity of the second networked communication device; receiving, at the one or more processors, an indication of a nature of the emergency situation; and presenting the indication of a nature of the emergency situation on the portion of the display map corresponding to the emergency zone, wherein the indication of the nature of the emergency situation was received via a light-sensing apparatus, wherein the indication of the nature of the emergency situation is an object identified by comparing captured images of the light-sensing apparatus with a plurality of templates stored on a cloud-based repository, wherein the emergency situation is identified via biometric data sensed from the second networked communication device, wherein presenting the indication of the second networked communication device includes presenting at a position within the map display corresponding to identification information for the second networked communication device, wherein the identification information is received in part via live streaming associated with the second networked communication device, and wherein the identification information is received in part via an identity-based navigation system associated with the second networked communication device; and further including a recording system separate from the first and second networked communication devices.

These and other features, aspects and advantages of the present invention will become better understood with reference to the following drawings, description and claims.

BRIEF DESCRIPTION OF THE DRAWINGS

Figure 5:
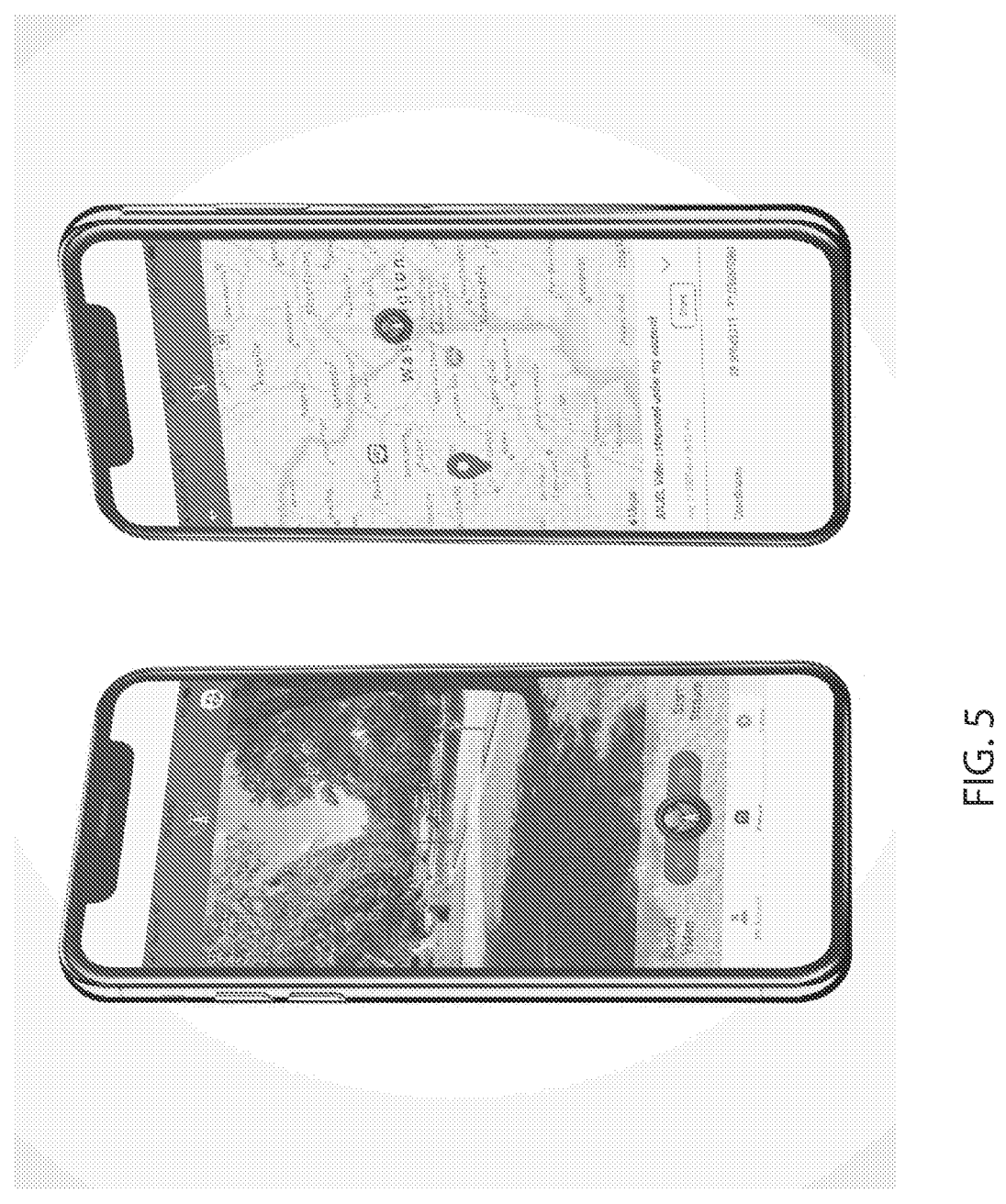

FIG. 5 is a schematic view of an exemplary embodiment of the present invention.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a cloud-based, geospatially-enabled data recording, notification, and rendering system.

Referring now to FIGS. 1 through 5, the present invention may include the following:

1. Networked Communication Devices.
2. Recording System.
3. Light-sensing Apparatus.
4. Biometric Sensing Apparatus.
5. Identity-Based Navigation System.
6. Online and Networked Data Repository/Storage.
7. Rendering System.
8. Notification System.
9. Provision System.

1. Networked Communication Device

In various implementations, the networked communication devices 100 may be smart phones, tablet computers, laptop computers, desktop computers, smart glasses, smart watches, lanyards, or bracelets, wearable computing devices, vehicle head units, or any suitable portable or non-portable computing device. Each networked communication devices 100 may include a memory, one or more processors (CPUs), a graphics processing unit (GPU), an I/O module including a microphone and speakers, a user interface (UI), and one or several sensors 19 including a Global Positioning Service (GPS) module. The memory can be a non-transitory memory and can include one or several suitable memory modules, such as random access memory (RAM), read-only memory (ROM), flash memory, other types of persistent memory, etc. The I/O module may be a touch screen, for example. In various implementations, each networked communication devices 100 can include fewer components or conversely, additional components.

The memory stores an operating system (OS), which can be any type of suitable mobile or general-purpose operating system. The memory may also store client applications, such as an emergency situation application 110, which may be configured to provide alerts to a supportive entity when the user is in an emergency situation or immediately thereafter, wherein the supportive entity may be an emergency responder, law enforcement or other security or safety personnel. The emergency response application 110 may also generate digital maps of the immediate surrounds, environment, and/or premises. The digital map may include an indication of an emergency zone depicting an area within a threshold range of the center of the emergency situation. The digital map may also include indications of the number of individuals or machine in the emergency zone.

Figure 1:
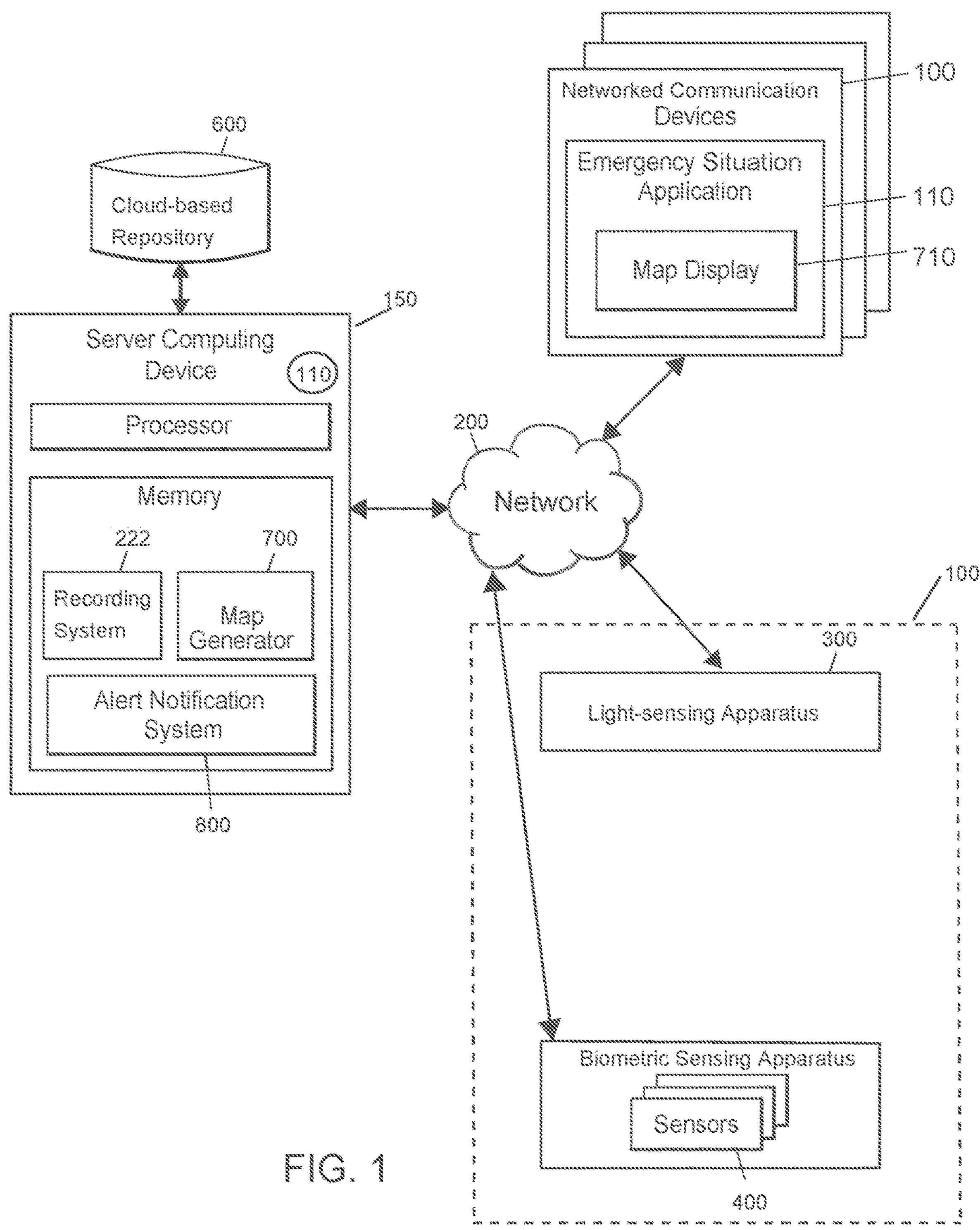
FIG. 1 is a schematic view of an exemplary embodiment of the present invention.

While the networked communication device 100 depicted in FIG. 1 includes a single emergency situation application 110 for interacting with a security system, the networked communication devices 100 may include several client applications. In some embodiments, the emergency situation application 110 provides alerts, live video feeds, map data, and other information to police officers, fire fighters, paramedics, etc. In other embodiments, the emergency situation application 110 obtains login information from the user and provides specific, personalized alerts, map data, and other information according to the user's nature as an individual, machine, supportive entity.

Just as the emergency situation application 110 may reside in the memory of a plurality of networked communication devices, so to the emergency situation application 110 may reside on a server computing device 150, separate and apart from any networked communication devices 100. The server computing device 150 may or may not reside in the network 200. The server computing device 150 may provide the map display and alerts to the networked communication devices 100, as described below.

A plurality of networked communication devices 100 may be associated with each other via the emergency situation application 110 (initially by way of a login/registration process for example). Thus, a primary user of the emergency situation application 110 may group a plurality users of the emergency situation application 110 into a "supportive entity" group, so that when an emergency situation is identified for the primary user, the users defined by the "supportive entity" group will receive the notification, display map, recorded date (e.g., live streaming video) via the system disclosed herein.

In short, the supportive entity or group thereof become witnesses of the primary networked communication device 100 self-identifying emergency situations, wherein these witness receive a display map of said the primary networked communication device 100 (relative to each witness networked communication device 100) along with additional identification information, such as video being live-streamed from the primary networked communication device 100.

2. Recording System

The recording system 222 may provide audio, video, biometric, and/or machine-performance recording equipment including, but not limited to, handheld systems and those integrated from other systems such as vehicles, homes, businesses, other individuals/machines/devices, etc.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time. Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

One of the main components of the recording system is to record in a remote storage/repository live streaming video from a networked communication device that has been determined to be in an emergency situation.

3. Light-Sensing Apparatus

The light-sensing apparatus 300 may be a high-definition camera (e.g., a 1080p camera, an 8-megapixel camera, etc.) and is configured to detect visible light images and video within a detection area of the present invention. The light-sensing apparatus 300 may reside on the networked communication devices 100 and/or be operatively associated with the above-mentioned hardware module.

In some embodiments, the light-sensing apparatus 300 may include several imaging cameras, such as a dual camera, which may be used to detect depth information. In any event, images may be detected continuously or periodically (e.g., 10 frames per second, 60 frames per second, 120 frames per second, etc.) and then provided, along with the other sensed imaging camera data, to the server computing device 150 for further processing as described in more detail herein.

The light-sensing apparatus 300 may provide video capturing functionality including but not limited to live streaming, 4. Biometric Sensing Apparatus The biometric sensing apparatus 400 may include sensors configured to detect and/or determine heartrate, breathing rate, blood pressure, perspiration, blood-oxygen level, neural processing metrics, memory capacity, animal and machine operating functions.

The biometric sensing apparatus 400 may reside on the networked communication devices 100 and/or be operatively associated with the above-mentioned hardware module. The data sensed/collected by the biometric sensing apparatus 400 may then be provided to the server computing device 150 for further processing as described in more detail herein.

The biometric sensing apparatus 400 may also include sensing "non-biological" data for machine users of the present invention. For instance, instead of an acceptable range of heart rates, such an apparatus 400 would be gauging an acceptable range of, say, engine temperature or some other measurable value that could indicate if a machine user is facing an emergency situation.

5. Identity-Based Navigation System

Figure 2:
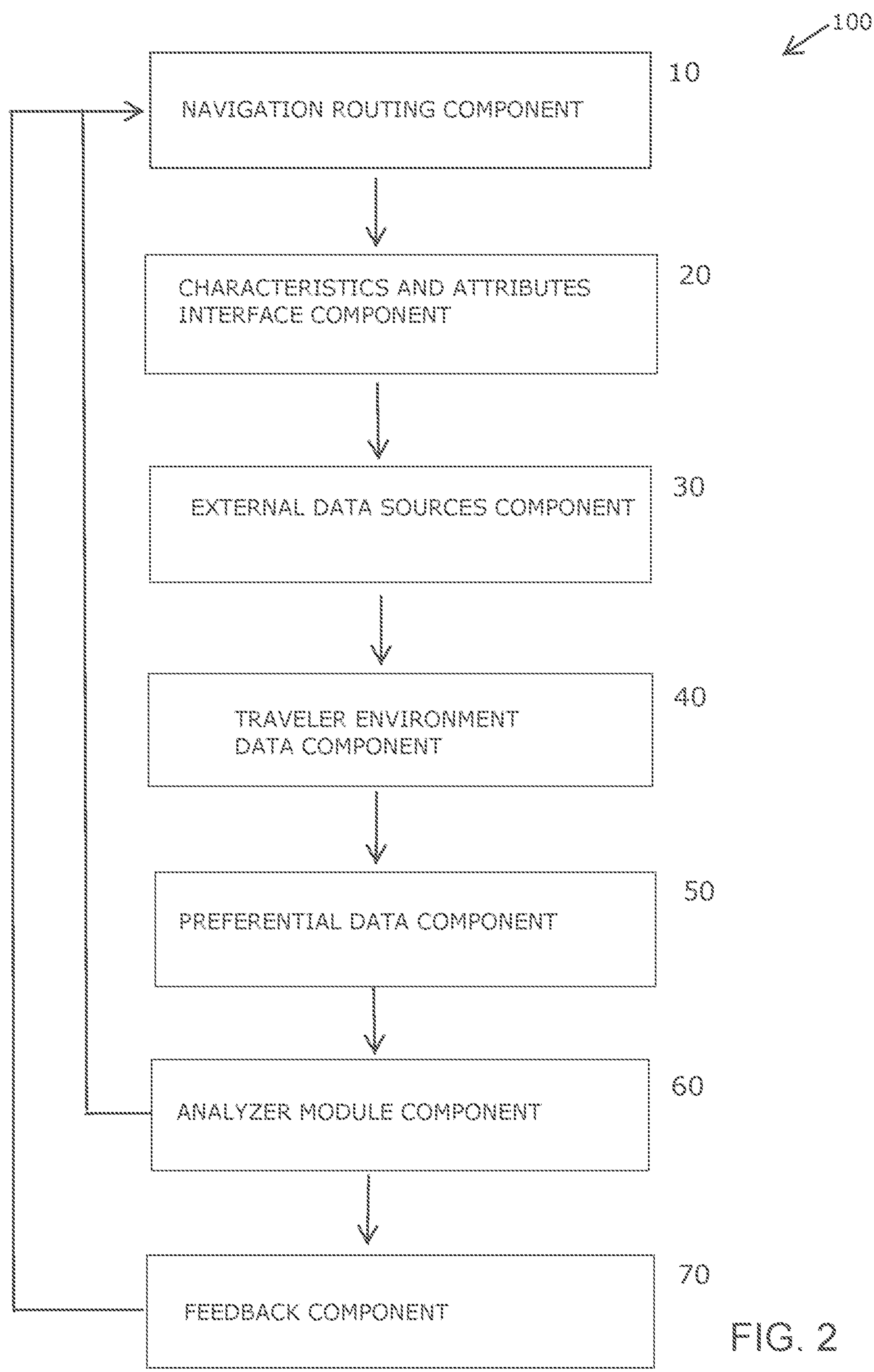
FIG. 2 is a schematic view of an exemplary embodiment of the present invention.
Figure 3:
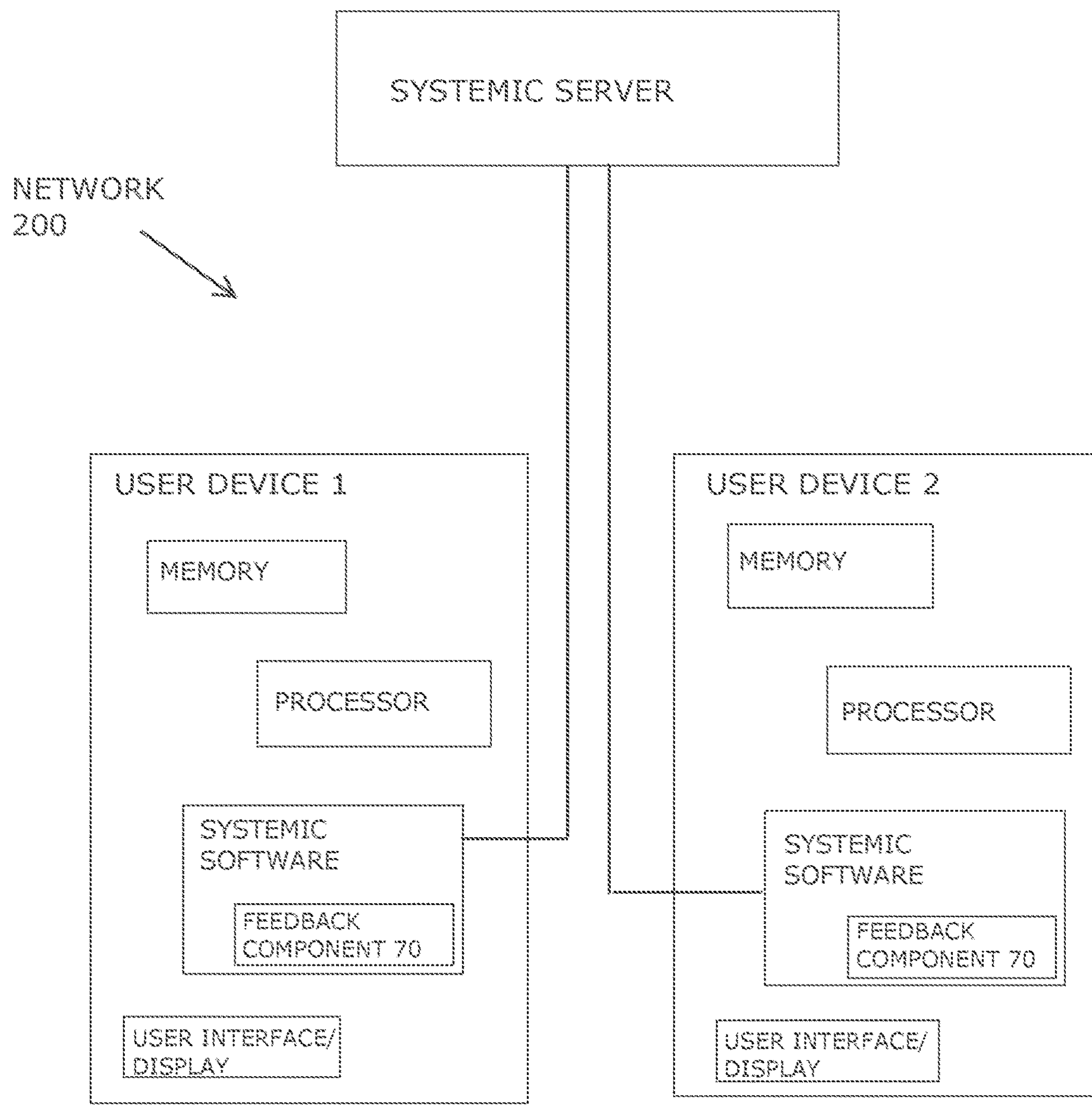
FIG. 3 is a schematic view of an exemplary embodiment of the present invention.
Figure 4:
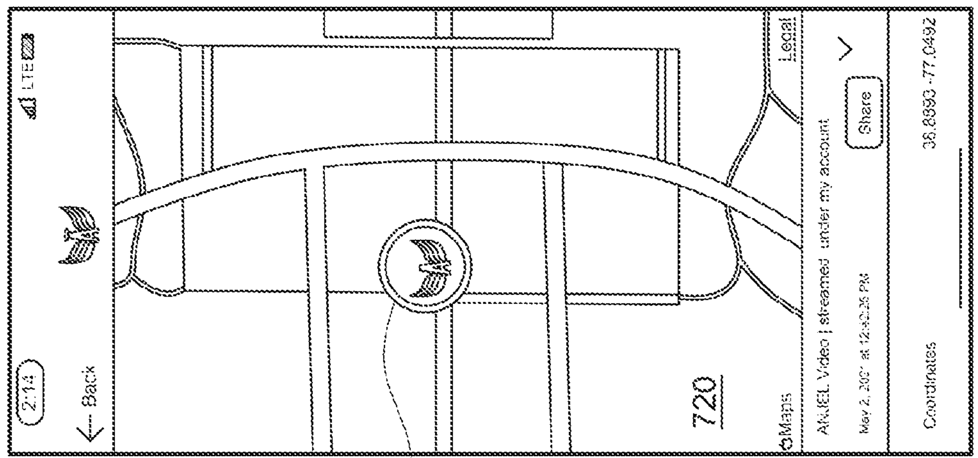
FIG. 4 is a schematic view of an exemplary embodiment of the present invention, illustrating a display map 720 representing the indicator 740 of a primary networked communication device 100, as well as a live-stream video 730 generated by the primary networked communication device 100, both of which may be embodied in a notification to another networked communication device if an emergency situation is identified for the primary networked communication device 100.
Figure 4:
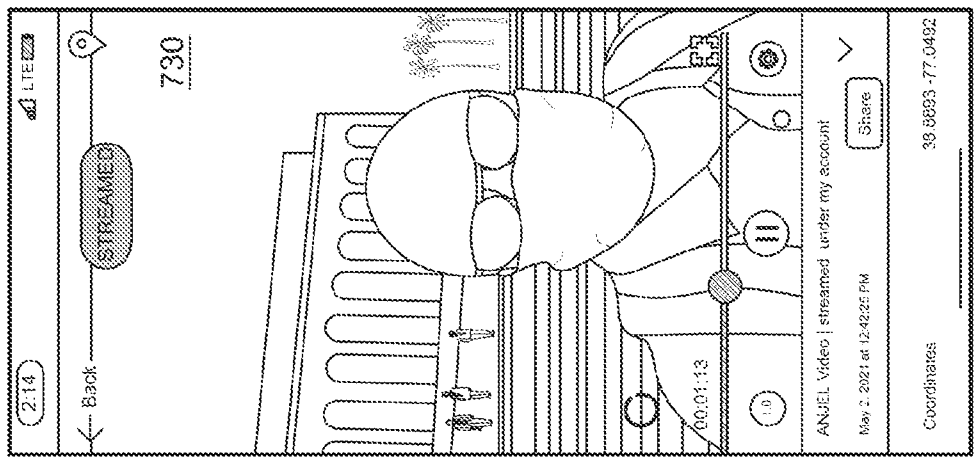

Identity-Based Navigation inputs, outputs, factors and elements may include the following systemic components (that may or may not be embodied in or reside in a networked communication device 100, as indicated by the reference number of FIG. 2):

A. Navigation Routing Component 10

The Navigation Routing Component may be configured to determine a plurality of travel routes between a departure point A and one or more destination points B″ based on extrinsic conditions. Extrinsic conditions may include timing constraints, distance, speed, obstacles and other characteristics of the route and/or a mode of transportation and/or environment itself, including as but not limited to traffic flow, network-user-supplied traffic volume, weather and road conditions. Thus, based on the information concerning such extrinsic conditions received from, say, a server via the Internet, the navigation routing component is configured to determine the most time-efficient routes and distance-efficient routes, e.g., one that requires the least travel time, to accomplish the trip's purpose despite any extrinsic conditions, as well as a plurality of travel routes that interconnect the departure point A and the one or more destination points B″.

B. Characteristics and Attributes Interface Component 20

The Characteristics and Attributes Interface prompts and receives input from users regarding intrinsic characteristics—i.e., attributes intrinsic to a user/traveling entity. These intrinsic characteristics of the traveling entity may include but are not limited to physical, social, cultural, racial, sexual, emotional, electrical, religious, class, dietary restrictions/preferences, income bracket, net worth, and/or any other characteristic that distinguishes one travel entity from another.

When a user initially utilizes the present invention for travel planning in accordance with the invention, a systemic server is configured to generate the Characteristics and Attributes Interface, typically through a user's computing device, wherein the user/travel entity is prompted for entering his/her personal data, e.g., his/her name, age, sex, marital status, occupation, city, education, religion and number of children, which are stored as intrinsic characteristics.

In certain embodiments, the user may be prompted to select preferences from different categories to be included in the personal data/intrinsic characteristics, including but not limited to music, entertainment, shopping, recreation categories. Input may be through any form of electronic input, including but not limited to a computer's user interface by way of any suitable peripheral input/output device.

C. External Data Sources Component 30

The present invention may include other external data sources, such as but not limited to social-media and other data sources about the user/traveling entity, about a local environment of each of the destinations, and about events associated with the environment of the destinations within the timing constraints.

The external data sources may include media sources, such as social network services, online communities, and online news sources. Information received from the external data sources may include information associated with social networks, blogs, and websites having a registered profile of the traveling entity, among other information. Information from the external data sources may be accessed and parsed through a data mining engine via the systemic network 200.

D. Traveler Environment Data Component 40

Traveler environment data may include information about the traveling entity's environment that affect the intrinsic characteristics and attributes, such as (but not limited to) physical, cultural, sexual, emotional, electrical, religious, class, dietary restrictions/preferences, income bracket, net worth, and/or any other characteristic that distinguishes one entity from another.

E. Preferential Data Component 50

Preferential data and other information about the traveling entity's environment that provides products, services, experiences, and the like, that are of interest or preference or benefit to the traveling entity, in full consideration of the intrinsic characteristics and attributes of the traveling entity may be determined (or "predetermined") by a preferential data component.

The predetermined preferential data may be utilized to adjust weightings of the routes and travel itineraries generated by the Navigation Routing Component. For instance, when a user/traveling entity plans to go from a departure point A to a destination point B, the Navigation Routing Component may compute travel itineraries or routes R1 and R2 according to the extrinsic conditions, intrinsic characteristics, external data sources and traveler environment data, then the present invention may reweight (possibly by way of an analyzer module discussed more below) each route after integrating the predetermined preferential data, which is a function of the extrinsic conditions, intrinsic characteristics, external data sources and traveler environment data. Through this iterative modality, the present invention is configured to optimize the route navigation process by integrating traveling-entity specific data inputted and subsequently determined.

The predetermined preferential data is stored in the systemic memory in such a way that when the Navigation Routing Component determines one or more predetermined preferential data is associated with, say, route R2, the Navigation Routing Component and/or analyzer module may adjust the weighting of route R2 so that route R2 can be automatically selected by the Navigation Routing Component for navigating the user from the departing point A to the destination B, so that the user/traveling entity passes or intersects the predetermined preferential data while traveling along route R2. Likewise, the Navigation Routing Component may adjust weightings of travel itineraries/routes in which the preferential data is located with different magnitudes.

F. Analyzer Module Component 60

The analyzer module is configured to combine, analyze, contextualize and convey Components 1-5 to the user/traveling entity via a delivery platform carried upon themselves and/or integrated into their mode of transportation and/or integrated into their device of preference (such as a networked and integrated home, business computing device, and/or that of another user/traveling entity).

The present invention being a method and system for route personalization is configured to integrate contextual data and extrinsic conditions embodied in Components 1-5 into route and/or travel itinerary determinations. The method and system are configured to provide weighted recommendations regarding a travel route or itinerary to a user based on these user-provided extrinsic conditions and contextualized data (intrinsic characteristics, external data, travel environment data, and preferential data).

In certain embodiments, the user may request a map of a route for travel from a departure point A to one or more destination points B″, for example, on a user device. The user device may be any computing device, as described herein. The user may launch the Navigation Routing Component configured to generate one or more possible routes R1-Rn, between A and B". The user may also launch the Characteristics and Attributes Interface configured to prompt and receive user-inputted intrinsic data. The analyzer module may be configured to obtain the external data sources and travel environment data to generate weighted recommendations for each route generated by the Navigation Routing Component. (In certain embodiments, the user may be asked to provide the external data sources and traveler environment data.)

Preferential data may then be determined by the preferential data component or analyzer module based on the intrinsic characteristics, external data sources and traveler environment data ('traveling entity data') for the possible routes generated by the Navigation Routing Component. The resulting predetermined preferential data may then be analyzed by the analyzer module and integrated into the Navigation Routing Component based on the intersection/association of the predetermined preferential data for each possible route. Thereby reweighted route recommendations may then be generated for each possible route based on the acquired traveling entity data and predetermined preferential data. The routes and weighted recommendations may then be displayed to the user via the user device. The user may then select a personalized route based on the weighted recommendations, as well as provide feedback regarding each listed weighted recommendation by way of a feedback component.

G. Feedback Component 70

The feedback data from the above-mentioned feedback component for each route recommendation displayed via Component 6, may be reintroduced to a collective, systemic network 200 of users/travel entities, thereby enriching and adding value to the travel experiences as the feedback data embodies positive/negative experiences of each user/travel entity for a potential route or a similar route or environment. Sharing the added and shared perspective of the intrinsic characteristics and attributes of the traveling entities adds another layer of iterative optimization.

The present invention produces an optimized travel solution for each person, entity, animal, machine, and/or object traversing a local route or environment, or a similar route or environment in a different location, or a completely unknown route, given the added and shared perspective of the local, current, previous or even distant traveler, based on their intrinsic characteristics and attributes, such as, but not limited to, physical, social, cultural, racial, sexual, emotional, electrical, religious, class, dietary restrictions/preferences, income bracket, net worth, and/or any other characteristic that distinguishes one travel entity from another.

The logic of the present invention may include the follow: (Sum of Components 1-5=Component 6)+User Response/Feedback=Component 7, which further refines/enriches Components 3-5, which are reinserted into the Sum of Components 1-5, thereby serving as a continuously-refined feedback loop.

A user of the present invention can input their personal attributes and characteristics such as (but not limited to) physical, social, cultural, racial, sexual, emotional, electrical, religious, class, dietary restrictions/preferences, income bracket, net worth, and/or any other characteristic that distinguishes one travel entity from another. The present invention then utilizes the combination of the above-listed components to assist the user/traveler by providing idealized travel route and/or services enroute to their destination point(s), thus increasing their user/traveler experience and adding value to their lives or existence (in the case of an entity or object).

Additionally, the present invention can also be used to understand and predict the travel, migratory, spending, and socio-economic patterns of people, entities, animals, machines, and/or objects, to the extent that supportive services (such as healthcare) can be offered and rendered when needed, even without the direct request of the party in need. For example, if someone who cannot swim travels into a rapidly flooding area, the present invention will recognize the confluence of a dangerous setting (via local weather information) and a person who lacks the ability to safely navigate that environment (based on their highly-refined user profile/intrinsic characteristics, as generated by the above-listed components of the present invention). The present invention will then possess the awareness and intelligence (artificial or otherwise) to alert emergency services of this endangered individual's whereabouts and probability of peril, with the pre-consent of the individual, to avail these emergency services of the potentially required life-saving services (especially if they become incapacitated).

The data sensed/collected by the Identity-Based Navigation system may then be provided to the server computing device 150 for further processing as described in more detail herein.

6. Online and Networked Data Repository/Storage

The online and networked data repository/storage 600 may include cloud service providers, which may be embodied, for example, as a system and computing environment that provides services to users of the cloud service provider through the sharing of computing resources via a data communications link. The cloud services provider may provide on-demand access to a shared pool of configurable computing resources such as computer networks, servers, storage, applications and services, and so on. Although in many cases such a cloud services provider may be accessible via the Internet, readers of skill in the art will recognize that any system that abstracts the use of shared resources to provide services to a user through any data communications link may be considered a cloud services provider.

7. Rendering System

The rendering system may embody a map generator 700 may generate a 2D or 3D digital map of the surrounding environment of a user and an indication of an emergency zone determined based on the location of the emergency situation. The map generator 700 may also generate indications of the number and precise physical locations of individuals, machines, and supportive entities in the emergency location. The building map generator 700 may also provide the digital map/map display 720 to the networked communication devices 100 for presentation, via a map display 710. System may embody a (map, etc.) of location of emergency situations.

The map generator 700 may utilize known computerized mapping systems—including but not limited to raster-base or vector-based systems—to produce a display map 720. For instance, where a computer extracts the corresponding vector-based map data from a database, and draws a bitmap image of the map, and wherein the computer then converts the bitmap to an image format supported by the user's Web browser and returns the image, sometimes embedded in HTML, to the user's Web browser so that it can be displayed.

The map display 710 may be configured to represent or display an indication of one or more network communication devices in the form of a dot, icon, or the like, on the display map 720.

8. Notification System

The notification system 800 may be configured to provide alerts to supportive entities and/or machines, include law-enforcement and other security-related personnel regarding the user in the emergency situation.

A determination of the emergency situation may happen through the processing of the above-mentioned functionality, wherein the server computing device 150 may compare, for instance via images capturing by the light-sensing apparatus 300, including features identified for as an object to features from template objects (also referred to herein as "template features") using image classification and/or machine learning techniques, where at least some of the template objects represent a person. The machine learning techniques may include linear regression, polynomial regression, logistic regression, random forests, boosting, nearest neighbors, Bayesian networks, neural networks, support vector machines, or any other suitable machine learning technique. For example, the widths and heights of people may be stored as template features along with skin tones for people, the widths and heights of noses, mouths, eyes, and their respective positions relative to each other. The template objects may also include other representations which are not of humans, such as representations of computers, other electronic devices, heaters, etc.

In some embodiments, the template features may be compared to the features for an object using a nearest neighbors algorithm. The nearest neighbors algorithm may identify template features which are the closest to the features of the object by creating numerical representations of the features to generate feature vectors, such as a pixel width and height of a nose, pixel values for the nose, and pixel distances from the edges of the face to the top, bottom, and sides of the nose, for example. The numerical representations of the features or feature vectors of the object may be compared to the feature vectors of template objects to determine a vector distance between the features of the object and each template object. The server computing device 150 may then determine whether the object is a human based on the amount of similarity, or the vector distance in the nearest neighbors algorithm, between the features for the object and the features for template objects that represent a human. If the closest template objects represent a human and image data is within the threshold body shape range, the object is identified as a human. The server computing device 150 may further analyze visible light images using image classification and/or machine learning techniques to identify a weapon in the building premises or a suspicious bag which may contain a weapon (e.g., a rifle bag). Weapons may include firearms such as rifles, pistols, handguns, automatic weapons, etc., knives, or other dangerous objects. Weapons may also include other objects which are not designed as weapons but may be used in a dangerous manner to cause harm, such as baseball bats, hammers, etc. Weapons may be identified before a gunshot is fired/detected. For example, the server computing device 150 may obtain template objects representing guns and other weapons and may identify features from these template objects. When the server computing device 150 obtains an image detected by the light-sensing apparatus 300, the server computing device 150 may identify features of the image using the techniques described above, such as SIFT, SURF, FREAK, BRISK, or any other suitable computer vision techniques. The features of the image may be compared to the template features of template objects representing weapons. The server computing device may then determine whether the image includes a weapon based on the amount of similarity, or the vector distance in the nearest neighbors algorithm, between the features of the image and the features for template objects that represent a weapon. Such an identification may comprise the "nature" of the emergency situation. Furthermore, indications of these objects (people, weapons, or other objects) may be provided to the map generator 700 for rendering on a display map 720 represented through the map display 710.

The light-sensing apparatus 700 may also sense infrared light or include 3D sensing systems, like passive or active LiDAR (Light Detection and Ranging). In certain embodiments, the light-sensing apparatus 700 may act as a actuator of the identification of the emergency situation (which in turn triggers the notifications and the exporting of the map data and the other identification information defined above). In one embodiment, the light-sensing apparatus may be able to sense the lights of an emergency personnel vehicle (e.g., squad car or ambulance). In other embodiments, the light-sensing apparatus 700 may detect and identify a badge of an emergency personnel (and store that information in the remote (cloud based) storage repository 600 for future retrieval for evidentiary purposes, for instance).

Likewise, the biometric sensing apparatus may detect biometric data (determine heartrate, breathing rate, blood pressure, perspiration, blood-oxygen level, neural processing metrics, memory capacity, animal and machine operating functions) and compare it to biometric signatures of the user (who may be animal, human, machine) to determine if the user is experiencing an emergency situation). For instance, the threshold range of human blood pressure may be identified and compared to the biometric data in real time by the server computing device 150. Through similar analysis as disclosed above, an identification of the emergency situation may be made through comparing the gathered/sensed biometric data with the stored signature/template thresholds.

The alert includes specific information regarding the user, including the nature and location of the emergency situation, thereby offering a geospatially-enabled emergency application providing video, audio and/or data recorded through the above-mentioned functionality. This alert and the associated data provided may be, at the users' discretion per recipient, stored off-device as aforementioned and discriminately released (enabled by and via the present invention) in a time-delayed fashion, allowing users (supported entities) to stage which recipients receive the notification and associated emergency event information in time, relative to the event and initial data recording/streaming.

Specifically, the notification system may also generate digital maps of the emergency zone that are presented via the map display 710. The digital map/display map 720 may include an indication of an emergency zone depicting an area within a threshold range of the emergency situation or within a threshold range of the center of the emergency situation. The digital map may also include indications of the number of individuals, machines, and supportive entities in the emergency zones within the display map 720.

The emergency response application 110 may provide/represent a panic button on the user interface of the networked communication device 100, wherein when the panic button is activated audio output is emitted, including but not limited to a high-frequency siren.

The emergency response application 110 may provide/represent a 'Text-to-911' button on the user interface of the networked communication device 100, wherein when the 'Text-to-911' button is activated 911 personnel and/or communication hubs receive a text indicating the previously identified emergency situation along with various informative data and information about the emergency situation, such as geospatial data, temporal data, biometric, performance and other similar data which enable help or assistance to be rendered. Importantly, networked communication devices 100 defined as being in the "supportive entity" group of a primary networked communication device 100 identified as experiencing an emergency situation can also activate the 'Text-to-911' button on their devices 100. Therefore, each witness (e.g., each of the supportive entity networked communication device 100) that is viewing the primary networked communication device 100 having the emergency situation via the display map 720 as well as the live-streaming video and/or other identification information may decide to activate the 'Text-to-911' button, even though there are not physically present at the emergency situation.

The emergency response application 110 may provide/represent a 'DPS' button on the user interface of the networked communication device 100, wherein when the 'DPS' button is activated Department of Public Safety (DPS) personnel and/or communication hubs are notified of the previously identified emergency situation via text, email and/or other electronic notification methods, indicating the previously identified emergency situation along with various informative data and information about the emergency situation, such as geospatial data, temporal data, biometric, performance and other similar data which enable help or assistance to be rendered. Importantly, networked communication devices 100 defined as being in the "supportive entity" group of a primary networked communication device 100 identified as experiencing an emergency situation can also activate the DPS button on their devices 100. Therefore, each witness (e.g., each of the supportive entity networked communication device 100) that is viewing the primary networked communication device 100 having the emergency situation via the display map 720 as well as the live-streaming video and/or other identification information may decide to activate the 'DPS' button, even though there are not physically present at the emergency situation.

9. Provision System

The provision system may include indication of individuals, machines, supportive entities and identification information. The identification information may include indications of event data, location data, biometric data, and the like. The provision system may generate identification information for the user for display at the position within the map display corresponding to the location of the user and/or networked communication devices 100. The provision system may retrieve information from the biometric sensing apparatus 400 and information from public databases, such as social networking databases, associated with the networked communication devices 100 as well as global positioning system information for each relevant networked communication device 100. For instance, the provision system may access an accelerometer of the relevant networked communication device 100, wherein the accelerometer is configured to generate acceleration data indicative of acceleration of the relevant networked communication device 100.

A computing device operatively associated with the Online and Networked Data Repository/Storage may determine relevant networked communication device 100 and present the identification information for the relevant networked communication device 100 on the map display screen. For instance, a dot on the map display may indicate the precise location of the relevant networked communication device 100/its associated user along with other individuals, machines, and/or supportive entities. Alongside the dot on the map display may be the identification information represented, including event data pertaining to the nature and ongoing proceedings (for instance, as garnered from the social media databases), as well as biometric data from the Biometric Sensing Apparatus.

In sum, component 1 uses data from components 2-5 to store various data in component 6, to produce component 7 and perform components 8-9. IF Component 1+(Sum of Components 2-5)+Component 6; THEN Components 7-9. The components 1-6 can be shuffled, interchanged or reconfigured in any order to produce a similar or identical output to the second part of this invented process, method and system, which would produce a similar or identical output or function (Components 7-9, which can also be shuffled, interchanged or reconfigured in any order).

By following the above-listed steps and logic, the present invention provides the user(s) (human and machine) with a means to capture video/audio output and otherwise record events that cause them stress or duress. A determination of such emergency situations may be determined through the biometric data. These recordings are stored in a remote data repository, and the user(s), as well as those duly designated (supportive entities/machines), are automatically notified by the present invention of the creation of this recording. This invention then allows the user(s), as well as those they designate, to access, view (in near real-time), analyze, retrieve, download and/or otherwise share this file as they will and agree. The present invention may also render a display of where this event occurs/occurred and provides additional data about said event.

A person or machine would use the present invention to solve the above-stated problems by using their networked communication device, including but not limited to remote computing device, smart device, or other networked video and audio recording device(s) to record any stressful (or other) event they encounter. This accounts for Components 1 and 2. Various sensory inputs (Components 3-5) are used to start, inform, and influence the data recording, which is then stored off the initial recording device in a networked data repository (Component 6). The present invention then notifies (Component 8) supportive individuals/machines of the creation of said data recording, informs/shows them where the event happened (Component 7) and provides them the ability to access, view (in near real-time), analyze, download, and otherwise share/use this recorded data as they will.

This invention can also produce location-based data about individual and/or machine-based biometric responses to various settings and exposures encountered.

There are manifold other applications/uses for this invention including, but not limited to, the production of graphs, analytics, maps and other renderings of human and/or machine responses to social, environmental, and/or other sources of stimulus.

In certain embodiments, the network may refer to any interconnecting system capable of transmitting audio, video, signals, data, messages, or any combination of the preceding. The network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

The server and the computer of the present invention may each include computing systems. This disclosure contemplates any suitable number of computing systems. This disclosure contemplates the computing system taking any suitable physical form. As example and not by way of limitation, the computing system may be a virtual machine (VM), an embedded computing system, a system-on-chip (SOC), a single-board computing system (SBC) (e.g., a computer-on-module (COM) or system-on-module (SOM)), a desktop computing system, a laptop or notebook computing system, a smart phone, an interactive kiosk, a mainframe, a mesh of computing systems, a server, an application server, or a combination of two or more of these. Where appropriate, the computing systems may include one or more computing systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example and not by way of limitation, one or more computing systems may perform in real time or in batch mode one or more steps of one or more methods described or illustrated herein. One or more computing systems may perform at different times or at different locations one or more steps of one or more methods described or illustrated herein, where appropriate.

In some embodiments, the computing systems may execute any suitable operating system such as IBM's zSeries/Operating System (z/OS), MS-DOS, PC-DOS, MAC-OS, WINDOWS, UNIX, OpenVMS, an operating system based on LINUX, or any other appropriate operating system, including future operating systems. In some embodiments, the computing systems may be a web server running web server applications such as Apache, Microsoft's Internet Information Server™, and the like.

In particular embodiments, the computing systems includes a processor, a memory, a user interface and a communication interface. In particular embodiments, the processor includes hardware for executing instructions, such as those making up a computer program. The memory includes main memory for storing instructions such as computer program(s) for the processor to execute, or data for processor to operate on. The memory may include mass storage for data and instructions such as the computer program. As an example and not by way of limitation, the memory may include an HDD, a floppy disk drive, flash memory, an optical disc, a magneto-optical disc, magnetic tape, a Universal Serial Bus (USB) drive, a solid-state drive (SSD), or a combination of two or more of these. The memory may include removable or non-removable (or fixed) media, where appropriate. The memory may be internal or external to computing system, where appropriate. In particular embodiments, the memory is non-volatile, solid-state memory.

The user interface includes hardware, software, or both providing one or more interfaces for communication between a person and the computer systems. As an example and not by way of limitation, an user interface device may include a keyboard, keypad, microphone, monitor, mouse, printer, scanner, speaker, still camera, stylus, tablet, touchscreen, trackball, video camera, another suitable user interface or a combination of two or more of these. A user interface may include one or more sensors. This disclosure contemplates any suitable user interface and any suitable user interfaces for them.

The communication interface includes hardware, software, or both providing one or more interfaces for communication (e.g., packet-based communication) between the computing systems over the network. As an example and not by way of limitation, the communication interface may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface. As an example and not by way of limitation, the computing systems may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the computing systems may communicate with a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination of two or more of these. The computing systems may include any suitable communication interface for any of these networks, where appropriate.

It should be understood, of course, that the foregoing relates to exemplary embodiments of the invention and that modifications may be made without departing from the spirit and scope of the invention as set forth in the following claims.

What is claimed is:

1. A system for presenting a map display of an emergency zone during an emergency situation, the system comprising:
- a first networked communication device having a user interface;
- a second networked communication device comprising:
  - a panic button;
  - a light-sensing apparatus;
  - an identity-based navigation component stored on a memory and executed by a processor;
- the identity-based navigation component comprising:
  - a global positioning system stored on the memory and executed by the processor;
  - an intrinsic data set comprising a plurality of personal data associated with the user;
  - a data mining engine stored on the memory and executed by the processor;
  - an external data sources comprising a plurality of local social data associated with the location, wherein the local social data comprises data mined by the data mining engine from social media posts; and
  - a feedback component stored on the memory and executed by the processor, the feedback component configured to identify a first emergency situation by comparing the intrinsic data set against the external data sources;

an alert notification module stored on the memory and executed by the processor, the alert notification module configured to identify a second emergency situation by comparing captured images of the light-sensing apparatus with a plurality of templates stored on a cloud-based repository, wherein the second emergency situation indication is an object identified by comparing captured images of the light-sensing apparatus with a plurality of templates stored on a cloud-based repository, and wherein the second emergency situation is identified via biometric data sensed from the second networked communication device;

the alert notification module configured to export to the first networked communication device automatically, in response to identification of the first or second emergency situations, map data for an emergency zone associated with the location of the second networked communication device; and wherein the alert notification module configured to export automatically, in response to deployment of the panic button, map data for an emergency zone associated with the location of the second networked communication device;

said user interface of the first networked communication device presenting the following:

a display map of the emergency zone, based on the map data, wherein the display map comprises:

an indicator of the second networked communication device on a portion of the display map corresponding to the emergency zone; and an indicator of the first networked communication device on the display map;

a live-stream video of the location, wherein the live-stream video is juxtaposed along said user interface, to the display map of the emergency zone, wherein the live-stream video comprises a running time of the live-stream video; and a public safety personnel button of said user interface of the first networked communication device configured upon enablement to transmit a notification to an emergency response unit, wherein the notification is configured to represent on an emergency response unit user interface the display map of the emergency zone juxtaposed to said live-stream video, whereby the juxtaposition of the live-stream video to the display map representing with the indicator of the second networked communication device facilitates a first user of the first networked communication device pressing the public safety personnel button.

2. The system of claim 1, wherein the first networked communication device is associated with a supportive entity of the second networked communication device.

3. The system of claim 1, further comprising a recording system separate from the first and second networked communication devices.

4. The system of claim 1, wherein the intrinsic data set comprises one or more external data sources having a registered profile of the user.

5. The system of claim 4, wherein the one or more external data sources comprises a social media database.

6. The system of claim 5, wherein the panic button is activated an audio output is emitted from the second networked communication device.

7. The system of claim 5, wherein the object is a weapon.

* * * * *